//

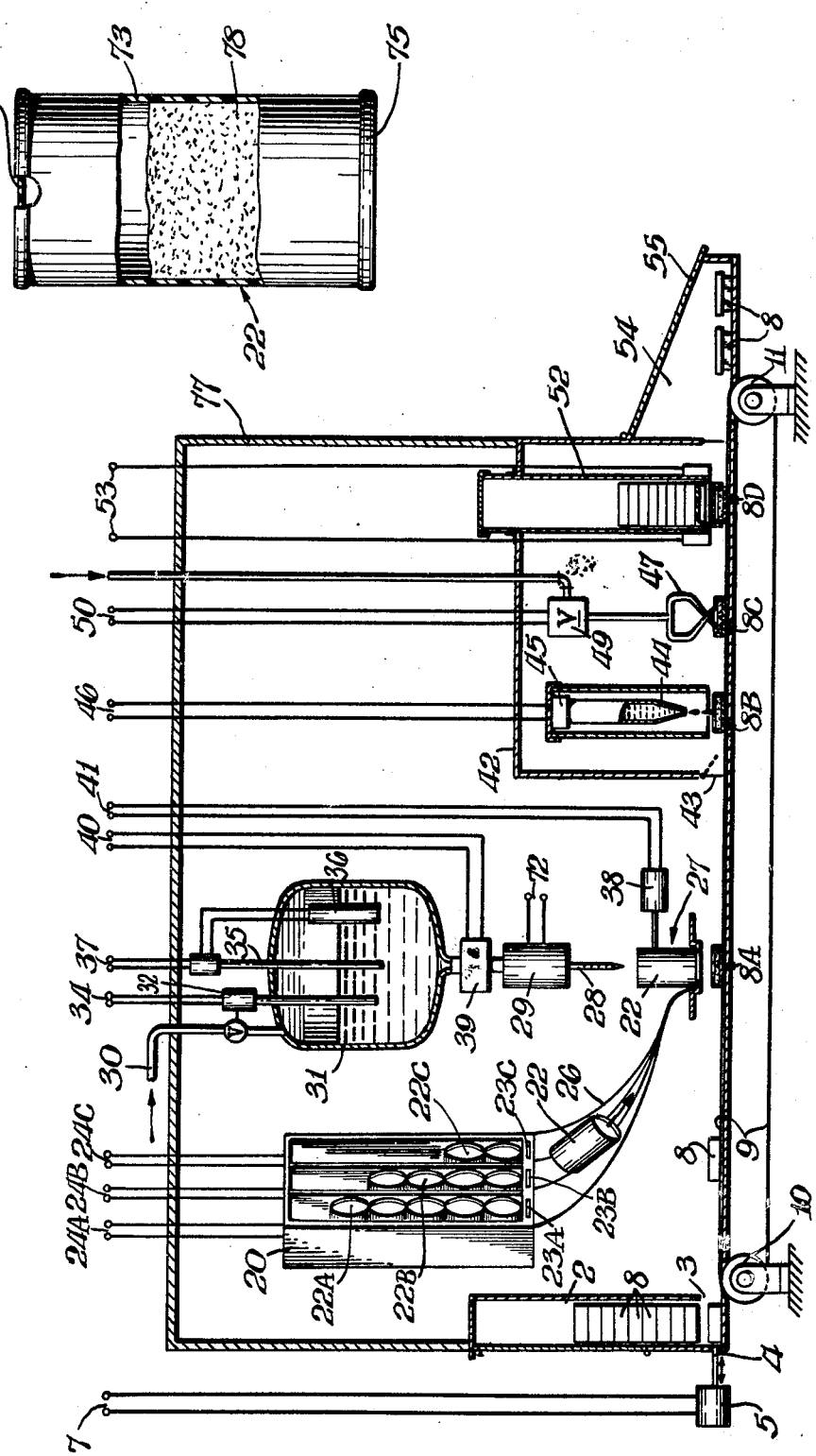

United States Patent Office 3,501,379
Patented Mar. 17, 1970

3,501,379
APPARATUS FOR PREPARATION OF MICROBIOLOGICAL CULTURE MEDIA
Kenneth B. Tate, Port Washington, N.Y., assignor to Chas. Pfizer & Co., Inc., New York, N.Y., a corporation of Delaware
Filed July 3, 1967, Ser. No. 650,676
Int. Cl. C12b 3/00
U.S. Cl. 195—127          10 Claims

ABSTRACT OF THE DISCLOSURE

Apparatus for preparing sterile containers filled with solidified or semisolid sterile culture media for use in culturing bacteria or other microorganisms. Programmed device automatically prepares media by mixing contents of puncturable canister containing dehydrated agar or other media with hot sterile water or by heating canister of reconstituted media. Sterile containers are filled with prepared media and may be cooled to solidify the media. By use of canisters containing media of various types, total needs of laboratory are prepared as required using single apparatus.

BACKGROUND OF THE INVENTION

This invention relates to the preparation of microbial culture media and, more particularly, to automatic devices for preparing containers filled with sterile culture media that can be used for microbial cultivation and studies.

Bacteriological laboratories often require large numbers of culture vessels, such as Petri dishes or culture tubes, filled with sterile culture media. These culture vessels are used for microbiological assays and other studies requiring growing microorganisms. The requirements of these laboratories usually involve culture media of many different types. Often, separate laboratory areas are set aside for filling culture vessels with the different types of required media. In addition, laboratory personnel are often occupied exclusively with the preparation of these various types of media and with filling culture vessels with the media, under sterile conditions.

The present invention allows culture vessels, which are filled with any one of many different types of culture media, to be prepared easily, conveniently and automatically with consequent economies in the laboratory area required and in the number of personnel involved. Media of many types may now be prepared more conveniently than was possible using older manual methods inasmuch as the previously needed storage and preparation area for each media type are now able to be replaced by the single apparatus of my invention. Additionally, more uniform media are produced using my invention since the preparation methods do not depend on the personnel involved. Inasmuch as my device permits the preparation of single culture vessels, successively, each containing a different culture medium, as needed, use of my device eliminates the need for preparing culture vessels, filled with each type of media, in batches, in advance of requirements. The consequent need to store the previously prepared, but as yet unneeded, vessels of culture media is eliminated. Prolonged storage, of course, increases the opportunity for contamination of the culture media in the vessels and this contamination likelihood is minimized by the use of my invention. In addition, prolonged storage may reduce the ability of the medium to support the growth of fastidious organisms due to the loss of nutrients and to dehydration.

SUMMARY OF THE INVENTION

The apparatus of this invention comprises a closed chamber which is kept at a high level of sterility together with means for supplying sterilized culture vessels, such as Petri dishes or culture tubes, to the chamber; means for storing individual canisters of sterile dehydrated or reconstituted culture media of different types outside or inside the chamber and supplying them, one-by-one, in a preselected order, to the chamber; means for liquefying the contents of the canister by heating the reconstituted culture media contained in the canister, or by admixing heated water with the dehydrated culture media contained in the canister; means for filling the sterile culture vessels with the liquefied culture media; means for closing the vessels and removing them from the sterile chamber; means for controlling the sequence of feeding operations and operations in the chamber by use of an automatic program control mechanism. In addition, my invention may also include means for refrigerating and solidifying the culture media contained in the sterile vessels before the closed sterile vessels leave the sterile chamber; means for controlling the type of culture media which are produced by use of an automatic programmed preset selection sequence by which various canisters containing specific types of culture media are fed into the sterile chamber or into the preparation device; means for adding blood or other nutrients to the culture media in the sterile vessel before the sterile vessel leaves the sterile chamber.

BRIEF DESCRIPTION OF THE DRAWINGS

For a better understanding of my invention, reference is made to the accompanying drawings where FIGURE 1 is a schematic drawing of one embodiment of my invention and FIGURE 2 is a schematic drawing of a type of canister useful with my invention.

DETAILED DESCRIPTION OF THE INVENTION

The devices of this invention comprise a sterile chamber, means for supplying culture vessels, such as Petri dishes, culture tubes or culture bottles, to the sterile chamber, means for supplying canisters of dehydrated or reconstituted culture media to the apparatus contained within the sterile chamber, means for automatically selecting the canisters to be supplied from a group of feed racks holding canisters which contain different types of culture media, means for filling the culture vessel with medium after the medium has been liquefied, means for closing the culture vessel, and means for removing the closed culture vessel from the sterile chamber.

The invention operates in the following manner. Petri dishes or other culture vessels, are loaded into a feed apparatus or magazine which may be located inside or outside of the sterile chamber. Canisters containing culture media of different types are loaded into storage bins or racks which are arranged so that canisters containing a particular type of culture medium may be selected individually, under automatic control, for delivery out of the particular rack and to the remainder of the apparatus. Where canisters of dehydrated culture media are used, the sterile chamber is arranged to be supplied with hot sterile water or an apparatus for producing the hot sterile water is included within the sterile chamber. Upon a signal from an automatic controller, a culture vessel is delivered from the vessel feed magazine, opened if necessary, and transported to a position in the sterile chamber at which liquefied culture medium can be placed in it. Contemporaneously, a container of dehydrated or reconstituted culture medium, the culture medium being of the type selected using a preprogrammed production schedule or using a selection signal supplied by the apparatus operator, is fed from the particular canister storage rack involved to a device within the chamber wherein culture medium in the canister is liquefied. Where the canisters contain reconstituted culture media, the media are liquefied by heating. Where the canisters contain dehydrated culture media, hot water must be used for liquefaction. In this case hot water is flowed into the canister through a hole which is punctured in it while it is secured in the liquefaction apparatus. Subsequent to liquefaction, the liquefied medium is flowed from the canister into the culture vessel and the empty canister is discarded. After filling, the culture vessel is transported, under automatic control, to a device where the culture vessel is closed or covered. Where the culture medium to be produced requires the addition of blood or other perishable, the newly filled culture vessel is transported from the filling position to a position where blood is added and mixed with liquid culture medium. Where blood or other perishable is to be added to culture vessel, it is not closed until after the addition. Closures for the culture vessel, which may be the upper halves of Petri dishes or cotton plugs or similar devices are stored in a separate magazine and fed, under automatic control, to the closure apparatus within the sterile chamber, as needed. After closure, the culture vessels may pass to a refrigerated zone within the chamber where the culture medium is cooled and solidified. After cooling and solidification, the newly prepared culture vessels are expelled from the apparatus.

The sterile chamber which encloses the apparatus of this invention, is a completely closed cabinet, which is constructed to maintain maximum sterility, and which may be constructed of metal, plastic, wood or other suitable material. Sterility may be maintained in the total unit by the use of a positive air pressure, germicidal ultraviolet illumination, or internal sprays of disinfectants or germicides.

The dispensing device for culture vessels may dispense closed or open culture vessels and may be located inside or outside the sterile chamber. Where the dispensing device is located outside the sterile chamber, means such as a double entrance chamber, are provided to allow the newly dispensed culture vessel to enter the sterile chamber without undue disturbance of the sterility of the chamber. When the culture vessel dispensing device is located outside the sterile chamber, the culture vessels are best supplied to the sterile chamber in a closed condition to avoid contamination of the interior of the culture vessel and to preserve the sterility of the culture vessel. When closed culture vessels are supplied, the culture vessel is opened within the sterile chamber and the closure portion, such as the upper half of the Petri dish or a cotton plug, is transported separately to the closure position in the sterile chamber where it is subsequently used to close the culture vessel after the vessel is filled with culture medium. When opened culture vessels are supplied, preferably from a magazine contained inside the sterile chamber, a separate magazine may be used to supply closure portions to the closure position in the apparatus. These magazines are driven by hydraulic, electromagnetic or pneumatic systems which are activated automatically by a program-controlled signal.

The bins or racks containing the canisters filled with culture media may be located inside or outside the sterile chamber. Where they are located outside the sterile chamber, means for permitting the canisters to enter the chamber without unduly affecting the sterility of the chamber must be provided. Double doors and an intermediate chamber are suitable means for accomplishing this entrance. The entrance means provided here, as well as those provided for the entrance of the culture vessels, may be fitted with germicidal illumination to aid in preserving the sterility of the sterile chamber.

Canisters containing various types of culture media are arranged in the bins or racks, separately by culture media type, so that a program-controlled signal may be supplied so as to select and transport a canister containing a particular type of culture medium to the apparatus. For typical laboratory operations, up to twelve different types of canisters, each containing a particular type of culture medium, may be arranged for supply to the liquefaction and filling apparatus.

The culture media contained in these canisters are usually based on agar or gelatin or another suitable culture meidum base. The culture media which are useful with this invention may also be semisolid media such as fluid thioglycollate or even sterile liquid media, for use in tissue culture studies, may be used. Where liquid or semisolid media to be used, the operation of the liquefaction device is suitably modified to enable the culture vessels to be filled with the liquid or semisolid originally contained in the canister.

The canisters are constructed of materials which will not deteriorate upon heating or contaminate the nutrient media and which are mechanically strong but easily punctured when proper tools are used. Plastics or metals are suitable materials for constructing the canisters.

The liquefaction apparatus may consist of any device which can securely grip the canister containing the nutrient medium while the canister is being heated or while hot water is being mixed with the nutrient medium. The device must also be capable of manipulating the canister to allow the application of heat or the entrance of water and must be able to dispense the liquefied media from the canister into the culture vessel and to discard the empty canister. The order of operation of the liquefaction apparatus is under program control. Typically, the liquefaction apparatus operates by puncturing holes in the canister for admitting water and dispensing the medium. In this case, means must be provided for cleaning the punch so as to avoid contamination of one medium with the ingredients of another.

Additional nutrients may be added to the medium while it is being held in the canister, before it is released to the culture vessel. Means, under program control, may be arranged so that additional nutrients, such as blood, may be supplied to the canister contents while the canister is in the liquefaction device.

The hot sterile awter, which is needed to liquefy the medium when a dehydrated medium is used, is supplied from a hot water tank which is located inside or outside the sterile chamber. The level of water in the tank, the temperature of the water and the dispensed volume of water are automatically controlled by signal.

Subsequent to filling, blood or another nutrient may be added to the medium contained in the culture vessel. This nutrient may be supplied by an automatic burette which is located within the sterile chamber. The burette is activated by signal, under program control, and the dispensed volume may be set automatically or preset in advance. After the addition of the nutrient, the liquid medium contained in the culture vessel may be stirred using sterile air or another suitable device.

At the termination of the procedure in the sterile chamber the culture vessel is closed. The closures may be supplied by a separate magazine similar to the magazine which supplied the culture vessels. This magazine is also program-controlled by signal. When the culture vessel has been supplied to the sterile chamber in closed condition, no separate magazine is needed and the closure piece is transported separately to the closure position and applied to the culture vessel there.

Subsequent to closure, the culture medium in the culture vessel may be solidified by refrigeration or cooling, within or outside of the sterile chamber.

As has been pointed out, the entire apparatus of this invention is under automatic program control although means may be provided for manual or semi-manual control. Transport of the culture vessels through the apparatus is by conveyor belt, circular platform, or other similar means. The canisters of nutrient media may be supplied to the liquefaction apparatus by gravity or by mechanical transport.

A schematic diagram, illustrating the general operation of an embodiment of my invention is shown in FIG-URE 1.

A supply of sterilized lower halves of Petri dishes 8 is contained in the vessel feed magazine 2. At the lower end of this magazine is an opening 3. A piston 4 driven from an element 5 pushes a Petri dish 8 onto the belt 9 whenever the element 5 is energized by a program-controlled signal applied to the terminals 7. The movement of the piston 4 can be caused by electromagnetic or hydraulic or pneumatic systems. The belt 9 moves in the direction shown by the arrows.

The dispensed half Petri dish 8 moves with the conveyor belt 9, which is driven by a program controlled motor, and is held on bearings 10 and 11. The driving motor is not shown. When the Petri dish 8 arrives in the position 8A it is stopped, either by an arresting mechanism (not shown) or by a system (not shown) which pushes the Petri dishes off the belt 9 and holds it in a fixed position or by stopping the belt. The stopping of the Petri dish at position 8A, however accomplished, is in response to a programming signal from the master controller (not shown).

A canister magazine 20 is provided in which are stored canisters which contain dehydrated culture media of different types. These canisters are arranged in separate columns, by culture medium type, of which three, namely 22A, 22B and 22C are shown. In general between five and twelve different media are sufficient for hospital service. For each column of canisters of nutrient media there is provided, at the lower end of the columns, a release or dispensing system 23A, 23B and 23C. Each of these release or dispensing systems can be energized by electrical signals from the programmer which are applied to the terminals 24A, 24B and 24C, respectively.

Upon the application of a signal from the programmer, the particular release mechanism 23A, 23B or 23C, will dispense a canister which slides down the chute 26 and falls into position 27 in the liquefaction apparatus. Above the can is a tool 28 which can be moved up and down by a system 29 which is controlled by the program. System 29 functions to drive the tool 28 downward into the canister, permitting water to flow through a conduit within the tool 28, into the canister, causing mixing of the water and the dehydrated culture medium. The tool 28, on further command of a program-controlled signal applied at the terminals 72, can then be moved further down to pierce a hole in the bottom of the canister 27 to allow dispensing of the mixed liquefied nutrient material into the Petri dish underneath the canister 27. Upon further signal, the tool 28 is retracted into the system 29, where the tool 28 may be cleaned and heated for sterilization, using electrical or other means.

Water for mixing with the culture media comes from a water conduit which is connected to the hot water tank inlet 30. From the inlet 30, it flows into the hot water tank 31. The water inlet flow is controlled by a liquid level sensor 32 which controls an electromagnetic valve 33. The system is connected to an electric supply system which is connected to terminals 34. The temperature of the hot water is controlled by a thermostat 35 which energizes an electric heater 36. Power is applied to the terminals 37. The water in the tank 31 is maintained at a temperature high enough to assure sterility. The flow and volume of the water to the tool 28 is program-controlled by the valve 39 and the signal to this valve 39 is applied to the terminals 40. After the canister 27 has been emptied it is discarded by a servo-mechanism 38 which is energized by terminals 41 at the proper program-controlled moment. The water tank 31 and control mechanisms need not be located inside the sterile chamber, as shown in FIGURE 1, but can be located outside.

After the Petri dish 8A has been filled it is moved by by a programmed mechanism (not shown) or on the conveyor belt 9 into a chamber 42 through a door 43. Refrigeration is provided in this cooling chamber to reduce the temperature of the nutrient material in the Petari dish 8B. If agar material is being used the temperature will be lowered from about 90° to about 50° C. Where blood or another nutrient is to be added to the agar solution this is done by means of a dispenser 44 and a dispensing mechanism 45 which is program-controlled by the application of a signal to the terminals 46. The dispensing mechanism 45 and the dispenser 44 may be an automatic burette or pipette which is signal controlled. Where more than one nutrient is to be added in this manner, a series of dispensing devices, similar to 44 and 45, may be used.

After the blood has been added, the Petri dish is moved to a further stage 8C where the mixture is stirred by an airblast mechanism 47. Compressed air, which has been sterilized, enters a tube 48 wherein the flow of air is controlled by a valve 49. The valve is energized by a program-controlled signal applied to the terminals 50 when stirring is desired.

The Petri dish is then moved into a new position 8D where a dispenser for the upper Petri dishes 52 is provided. This dispenser is similar in construction to the dispenser 2 for the lower Petri dishes, although this dispenser is program-controlled by the application of a signal to the terminals 53. When the Petri dishes have been supplied at the magazine 2 in complete form, the dishes will have been opened for filling and the upper dish will have been transported to position 8D, separately. In this case, the magazine 52 is not necessary and a program-controlled servomechanism will place the upper dish on the lower one.

After the upper-Petri dish has been applied, a number of Petri dishes are collected in the temperature controlled sterile chamber 54 having a lid 55 that can be opened so that the ready Petri dishes can be removed. Where canisters of reconstituted agar are used, the hot water tank 31 is not required and the nutrient media are liquefied by heating by electrical or other means.

The walls of the sterile chamber are shown at 77.

FIGURE 2 is a schematic drawing of an embodiment of one type of canister 22 which may be used with this invention. The body of the canister 73 is comprised of a sturdy plastic or metal can which is heat resistant and the ends of the canister 74 and 75 are plastic or metal disks which are heat resistant but which are easily punctured by the tool 28. The medium is shown as 78.

The canisters may be supplied for use with this invention in the form of packs which fit directly into the racks 22A, 22B, and 22C.

What is claimed is:

1. An apparatus for the preparation of culture vessels filled with sterile bacteriological culture media which comprises a sterile chamber; means for supplying culture vessels to the sterile chamber; means for storing a plurality of groups of canisters, each group of canisters containing a culture medium of a particular type; means for selecting an individual canister containing sterile, solid culture medium of a particular type; means for supplying individual canisters, one by one, under control of selection means for the type of culture medium, to the sterile chamber; means for supplying said canister to a liquefaction device in the sterile chamber, said liquefaction device comprising means for liquefying the culture medium contained in said canister; means in said sterile chamber for filling said culture vessels with liquefied media; closure means for said culture vessels disposed in the sterile chamber and after said filling means and automatic control means for sequencing the operations in the apparatus so that, upon selection of a particular type of culture medium, the contents of a canister containing said medium is liquefied and supplied to a culture vessel.

2. The apparatus of claim 1 where refrigeration means are used after closure of the culture vessel to solidify culture medium contained therein.

3. The apparatus of claim 1 which comprises, in addition, means disposed within said sterile chamber for adding additional nutrients, in liquid form, to the liquefied culture medium contained in the culture vessel, prior to closure.

4. The apparatus of claim 1 wherein the sterile solid culture medium contained in the canisters is dehydrated culture medium and the liquefaction means adds hot water to the dehydrated culture medium.

5. The apparatus of claim 1 where the sterile solid culture medium is reconstituted culture medium and the liquefaction means utilizes heating.

6. The apparatus of claim 1 which comprises, in addition, control means for preselecting the order of canisters containing particular types of sterile solid culture media to be supplied to the chamber and liquefied.

7. The apparatus of claim 2 which comprises, in addition, means for adding additional nutrients, in liquid form, to the liquefied culture medium contained in the culture vessel, prior to closure.

8. Apparatus of claim 7 wherein the sterile solid culture medium contained in the canisters is dehydrated culture medium and the liquefaction means adds hot water to the dehydrated culture medium.

9. The apparatus of claim 7 where the sterile solid culture medium is reconstituted culture medium and the liquefaction means utilizes heating.

10. The apparatus of claim 3, wherein the means for adding additional liquid nutrients to the liquefied culture medium comprises, in addition, means for mixing the additional nutrients with the liquefied medium by the use of single or plural streams of sterilized air which agitate the mixture of medium and nutrient, causing mixing.

References Cited

UNITED STATES PATENTS

| | | | |
|---|---|---|---|
| 2,689,818 | 9/1954 | Fischer | 195—138 |
| 3,139,343 | 6/1964 | Baselt | 222—86 |

ALVIN E. TANENHOLTZ, Primary Examiner

U.S. Cl. X.R.

195—138, 139; 222—86